Dec. 5, 1967     C. HERRERA     3,356,127
WINDOW COVERS, PARTICULARLY FOR AIRCRAFT
Filed July 7, 1965     3 Sheets-Sheet 1
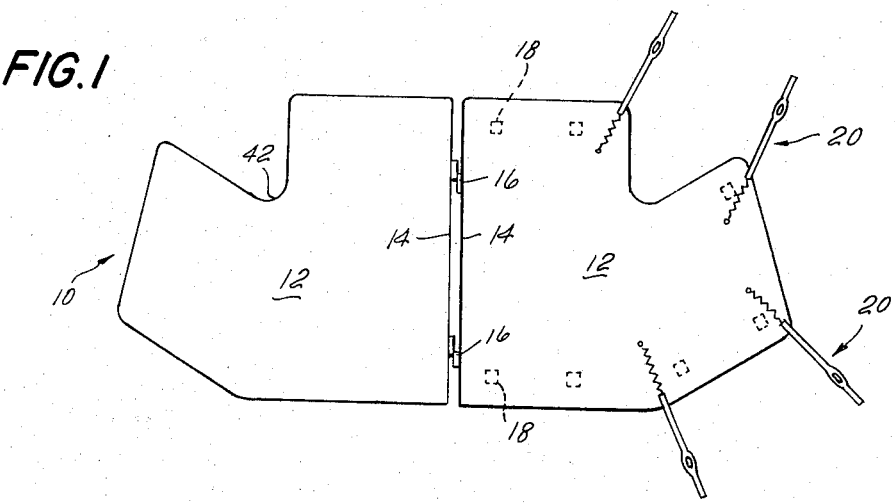
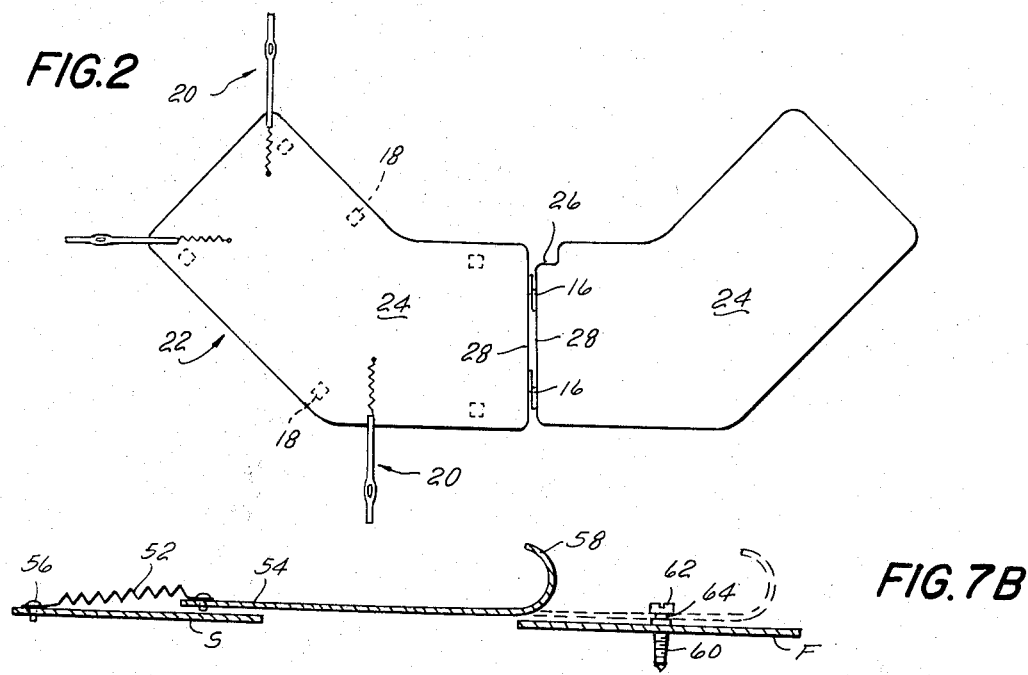
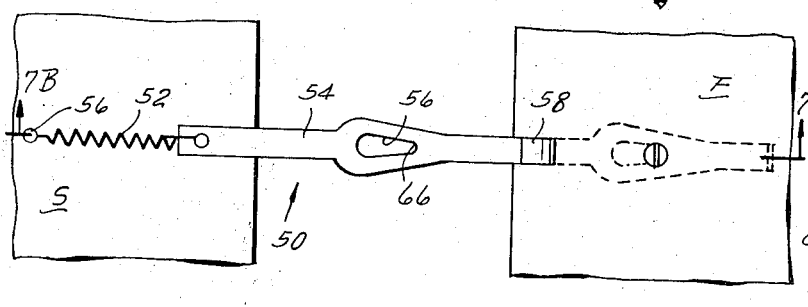
INVENTOR
CRISOGONO HERRERA
BY Steinberg & Blake
ATTORNEYS Dec. 5, 1967 C. HERRERA 3,356,127
WINDOW COVERS, PARTICULARLY FOR AIRCRAFT
Filed July 7, 1965 3 Sheets-Sheet 2

INVENTOR
CRISOGONO HERRERA

BY Steinberg & Blake
ATTORNEYS

Dec. 5, 1967  C. HERRERA  3,356,127
WINDOW COVERS, PARTICULARLY FOR AIRCRAFT
Filed July 7, 1965  3 Sheets-Sheet 3
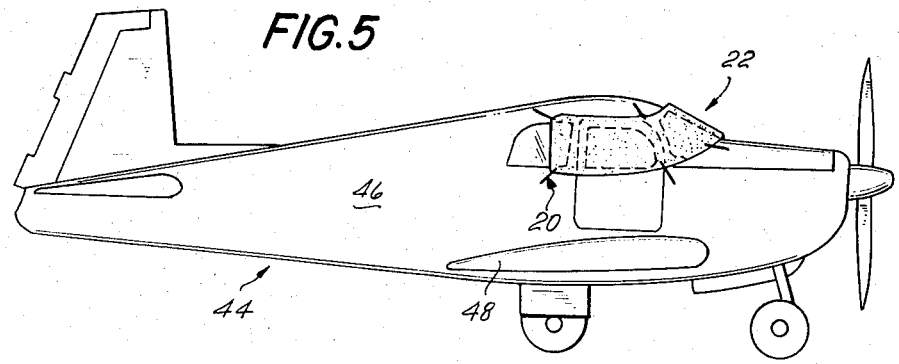
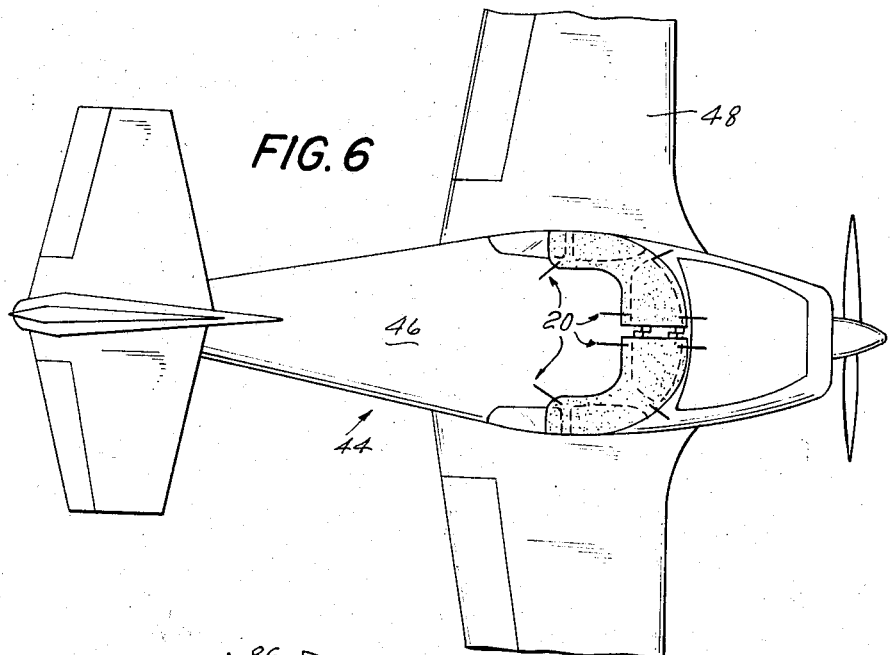
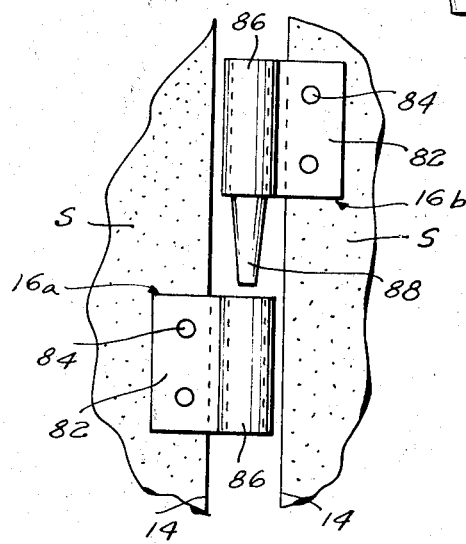
INVENTOR
CRISOGONO HERRERA
BY
*Steinberg & Blake*
ATTORNEYS United States Patent Office 3,356,127
Patented Dec. 5, 1967

3,356,127
WINDOW COVERS, PARTICULARLY FOR AIRCRAFT
Crisogono Herrera, Apartado Postal 1254, Monterrey, Nuevo Leon, Mexico
Filed July 7, 1965, Ser. No. 470,092
11 Claims. (Cl. 160—181)

The present invention relates to cover assemblies.

In particular, the present invention relates to cover assemblies which are adapted to be used for covering the windshield or other window of a vehicle such as an aircraft.

As is well known, vehicles such as aircraft quite often remain for considerable periods of time in a vast open space such as an air field where the hot sun can beat down hour after hour through the windows of the aircraft into the interior thereof. The effects of the heat derived from the sun in the interior of the aircraft under these conditions are particularly intense in the case of rays of the sun which pass through the windshield of the aircraft, so that it is for this reason that the present invention relates primarily to windshield covers to prevent or at least diminish the passage of the sun's rays into the interior of the aircraft. In the case of an aircraft, which can include any type of vehicle capable of flying, including helicopters, gliders, as well as propeller or jet-operated aircraft, the heat which develops in the interior of the aircraft due to the rays of the sun passing through the windshield thereof can undesirably influence delicate instruments situated in the aircraft at the dashboard panel thereof, for example.

It is therefore a primary object of the present invention to solve the above problem by providing for the windshield of an aircraft a cover assembly which will protect to a very great extent the interior of the aircraft from the effects which the rays of the sun passing unimpeded through the windshield would otherwise have.

A further object of the present invention is to provide a cover assembly which is very easy to mount on the aircraft in a position covering the windshield thereof as well as very easy to remove.

Also, it is an object of the present invention to provide a cover assembly which is made up of a relatively small number of inexpensive components which can be very easily assembled and disassembled.

Furthermore, it is an object of the present invention to provide a cover assembly which while it is capable of covering a windshield or an aircraft so as to protect the interior thereof from the rays of the sun, nevertheless is capable at the same time of maintaining a free flow of air along the surface of the windshield at the exterior thereof so that in this way an excessive rise in the temperature of the interior of the aircraft is reliably avoided.

Also, it is an object of the present invention to provide a cover assembly which will be incapable of scratching or otherwise damaging the windshield or other window of the aircraft.

The cover assembly of the present invention is primarily intended for use in connection with the windshield of an aircraft, although it is also capable of being used with other windows of aircraft and the cover assembly of the invention is in general made up of a pair of cover sheets which are arranged in side-by-side relation and which when thus arranged have a configuration conforming generally to that of the windshield or other window which is to be covered and of course these sheets are situated in a position covering the windshield or other window to whose configuration they generally conform. The pair of cover sheets of the assembly of the invention have a pair of substantially coextensive side edges situated adjacent each other, and they also have inner surfaces directed toward the windshield or other window which is covered and outer surfaces directed away from this windshield or other window. Releasable connecting means is operatively connected with the sheets in the region of their coextensive side edges for releasably connecting the sheets to each other in the region of their side edges which are adjacent each other. A spacer means is operatively connected to the sheets at their inner surfaces for maintaining these inner surfaces spaced from the exterior surface of the windshield or other window by a distance sufficient to define between the cover sheets and the windshield or other window a gap through which air may circulate. A releasable mounting means is operatively connected to the pair of cover sheets for releasably mounting the latter on the aircraft in a position covering the windshield or other window thereof.

The invention is illustrated by way of example in the accompanying drawings which form part of the application and in which:

FIG. 1 is an illustration of part of one possible embodiment of a cover assembly according to the invention, the particular structure of FIG. 1 being designed for use with an aircraft having a high wing;

FIG. 2 illustrates another embodiment of a cover assembly according to the invention, this particular embodiment being adapted for use with a low-wing aircraft;

FIG. 5 is a schematic side elevation of a low-wing aircraft provided with a cover assembly according to the embodiment shown in FIG. 2;

FIG. 6 is a schematic top plan view of the aircraft of FIG. 5 provided with the cover assembly of the invention as illustrated in FIG. 2;

FIG. 7A is a fragmentary top plan view of part of an aircraft and a cover sheet of a cover assembly of the invention with a stretchable unit of the present invention which forms part of a means for releasably mounting the cover assembly of the invention on the aircraft;

FIG. 7B is a longitudinal sectional illustration of the structure of FIG. 7A taken along line 7B—7B of FIG. 7A in the direction of the arrows;

FIG. 9 illustrates the structure of a connecting means of the invention for releasably connecting a pair of cover sheets to each other.

Figure 3:
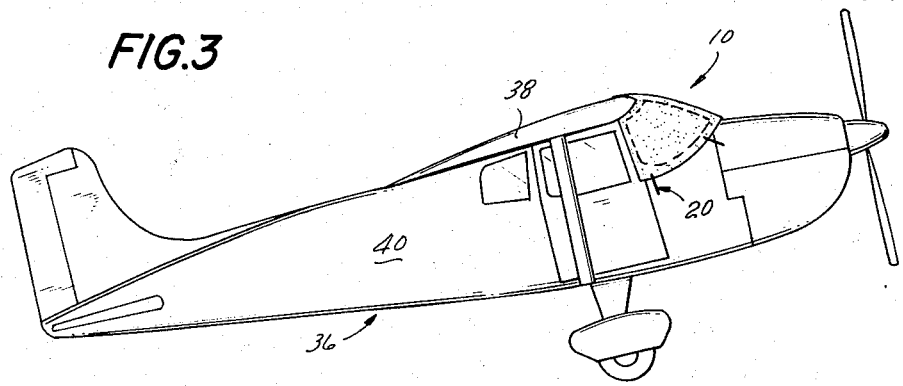
FIG. 3 is a schematic side elevation showing a high-wing aircraft provided with the cover assembly of FIG. 1.

Referring to FIG. 1, the particular cover assembly 10 of the invention illustrated therein includes a pair of identical flexible cover sheets 12 which are given any required configuration so that they will cover the windshield or other window by conforming in general to the configuration thereof. It is preferred to use for the cover sheets 12 a flexible resilient sheet metal which can easily be given the required shape, which is quite durable, and which at the same time is opaque, so that it will not permit light rays to pass therethrough. Such flexible resilient metal sheets are quite inexpensive and are light weight and easy to handle, as well as simple and inexpensive to manufacture. Of course, the costs are also maintained low by using for the cover assembly 10 a pair of sheets 12 which are of an identical configuration.

The pair of cover sheets 12 are arranged in the illustrated side-by-side relation where they have adjoining coextensive side edges 14 situated next to each other, although it is to be noted that there is indeed a slight gap between these edges 14. The pair of cover sheets 12 carry in the region of their coextensive side edges 14 a releasable connecting means 16 capable of releasably connecting the sheets 12 to each other in the side-by-side relation shown in FIG. 1.

The surfaces of the sheets 12 which are visible in FIG. 1 are their outer surfaces which are directed away from the windshield or other window which is to be covered. At their inner surfaces which are directed toward the window, the sheets 12 each carry a plurality of spacer means 18 which extend from these inner surfaces into engagement with the windshield or other window. As a result these spacer means 18 maintain the cover sheets 12 spaced from the windshield or other window so as to define with the latter a gap through which air can circulate.

A releasable mounting means 20 is provided for releasably mounting the cover sheets 12 on the aircraft in a position covering the windshield or other window thereof. FIG. 1 illustrates a plurality of spacer means 18 and mounting means 20 operatively connected with the right sheet 12 of FIG. 1, but it is to be understood that these spacer means 18 and mounting means 20 are also connected in the same way to the left sheet 12 of FIG. 1. The plurality of spacer means 18 may be distributed as indicated in FIG. 1 for the right sheet 12 thereof, so as to provide a substantially unobstructed gap between the sheets 12 and the windshield or other window covered thereby, and the plurality of releasable mounting means 20 are chosen and distributed in such a way that they also will provide a secure mounting of the cover assembly 10 while at the same time permitting the assembly to be quickly and easily removed from the aircraft, as will be apparent from the description which follows.

The particular cover assembly 10 shown in FIG. 1 is adapted for use with an aircraft having a high wing. However, the cover sheets of the invention can be given any configuration required by the particular aircraft, and FIG. 2 shows a cover asembly 22 also constructed according to the present invention but having a pair of cover sheets 24 which are of a different configuration from the cover sheets 12 and which in the particular example illustrated in FIG. 2 are adapted to cover the windshield of an aircraft having a low wing.

The pair of cover sheets 24 of the cover assembly 22 are also of a substantially identical configuration. The only difference is that the right sheet 24 of FIG. 2 has at its upper left corner a notch 26 which is provided simply in order to permit part of the aircraft to be situated at this notch 26. In this simple way the sheet metal cover sheets of the invention can easily be adapted to conform to the configuration of any protrusions or the like on the aircraft at the windshield or other window thereof which is to be covered. The pair of cover sheets 24 also are arranged in side-by-side relation and have a pair of substantially coextensive side edges 28 arranged adjacent each other. The connecting means 16 of the embodiment of FIG. 1 is also used in the embodiment of FIG. 2 for releasably connecting the sheets 24 to each other, and the same is true of the spacer means 18 and the releasable mounting means 20. In other words while the pair of cover sheets of a cover assembly of the invention may have any required configuration conforming to the windshield or other window which is to be covered, the connecting means for releasably interconnecting the pair of cover sheets, the spacer means, and the releasable mounting means 20 will always be the same although their particular distribution and number carried by each sheet may be different depending upon the particular configuration and size of the sheet.

Of course, in the case of FIG. 2 it is the left sheet 24 which is shown as provided with the plurality of spacer means 18 and releasable mounting means 20, and it is to be understood that the right sheet 24 of FIG. 2 is provided with the plurality of spacer means 18 and releasable mounting means 20 in the same way.

Figure 4:
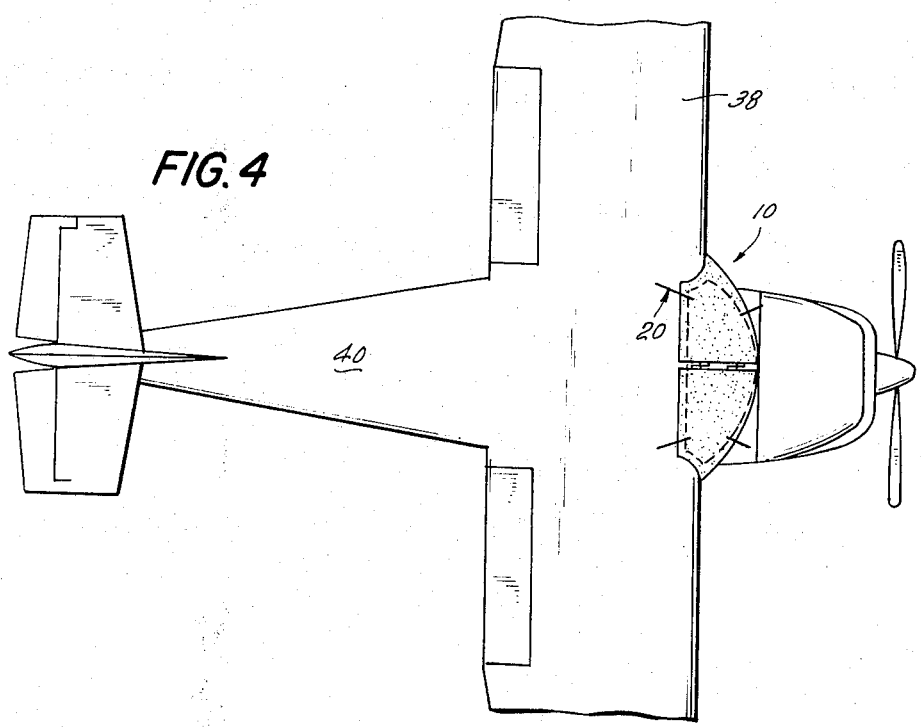
FIG. 4 is a schematic top plan view of the aircraft of FIG. 3 with the cover assembly of the invention carried thereby.

Referring now to FIGS. 3 and 4, there is illustrated therein an aircraft 36 having a wing 38 situated at an upper part of the fuselage 40, so that this is a high-wing type of aircraft, and it will be noted that this aircraft is provided with the cover assembly 10 of FIG. 1. In particular it is to be noted that the curved portions 42 of the pair of sheets 12 are designed so as to pass around the leading edge of the wing 38. The general arrangement of the plurality of mounting means 20 is indicated in FIGS. 3 and 4 which in general show how the cover assembly 10 of the invention is applied to the high-wing aircraft 36.

FIGS. 5 and 6, on the other hand, show an aircraft 44 having a fuselage 46 which carries a wing 48 situated at a lower part of the fuselage, so that the aircraft 44 is a low-wing type of aircraft, and this type of aircraft is adapted to receive, by the configuration of its windshield, the cover assembly 22 of FIG. 2. In this case also FIGS. 5 and 6 schematically indicate the general arrangement of the mounting means 20.

Referring now to FIGS. 7A and 7B, there is indicated therein a portion S of any of the cover sheets of the invention as well as a portion F of the fuselage of an aircraft. FIGS. 7A and 7B show the details of the releasable mounting means 20 of the invention. This releasable mounting means 20 includes a plurality of stretchable units 50 each of which is capable of longitudinal stretching movement in a manner described below. Each stretchable unit 50 includes an elongated coil spring 52 and an elongated strip 54 which may be made of metal. The coil spring 52 is fixed, as by rivets 56, to the cover sheet S at the exterior surface thereof, and the free end of the coil spring 52 is fixed to one end of the elongated metal strip 54 which is formed intremediate its ends with an elongated opening 56. Distant from the spring 52 the strip 54 is provided with a curved handle portion 58 facilitating grasping and displacing of the strip 54 by the operator. The mounting means 20 furthermore includes a plurality of pins 60 in the form of screw members threaded into the fuselage F and situated beyond the periphery of the cover sheets which are arranged in side-by-side relation. Each pin or screw 60 has a head end 62 situated beyond the exterior surface of the fuselage F, and just beneath its head end each pin 60 is formed with an annular groove 64. The opening 56 of each strip 54 is of a triangular configuration having an apex 66, and when the cover assembly of the invention is attached to an aircraft the several apexes 66 of the openings 56 respectively receive the pins 60 and the edge portions of the strips 54 which define the apexes 66 are received in the annular grooves 64 of the pins 60.

Thus, with the structure shown in FIGS. 7A and 7B once the pair of sheets are situated in the general location desired, covering the windshield or other window, the operator simply displaces the strips 54 away from the cover sheets until the pins 60 are respectively received in the openings 56, and thereafter the springs 52 are permitted to contract until the edge portions which define the apexes 66 are respectively received in the grooves 64, and now the cover assembly of the invention is securely but releasably mounted on the aircraft covering the windshield or other window thereof.

Figure 8A:
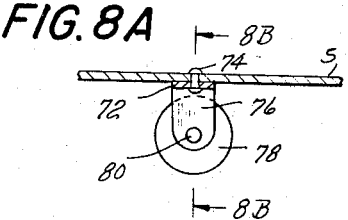
FIG. 8A shows in side elevation a spacer means which forms part of the cover assembly of the invention.
Figure 8B:
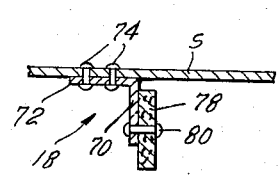
FIG. 8B is a fragmentary sectional view of the spacer means of FIG. 8A taken along line 8B—8B of FIG. 8A in the direction of the arrows.

The construction of the spacer means 18 is illustrated in FIGS. 8A and 8B. This spacer means includes an angle bracket 70 having a leg 72 fixed to the inner surface of each cover sheet S, as by rivets 74. Each angle bracket 70 has a leg 76 extending away from the inner surface of the cover sheet S toward the windshield or other window which is to be covered, and it is this leg 76 which carries a disc 78 made of a non-metallic material which may be any suitable plastic, fiber composition, or the like, although leather is preferred for the disc 78. A rivet 80 fixes the disc 78 to the leg 76 of the bracket 70 so that the disc 78 is generally in a plane perpendicular to that of the cover sheet S, and a periphery of the disc 78 engages the exterior surface of the windshield or other window which is to be covered, so that in this way the plurality of spacer means 18, arranged as indicated in FIGS. 1 and 2, on the one hand maintain a gap between the windshield or other window and the cover sheets so that air can circulate through this gap and on the other hand protect the exterior surface of the windshield or other window from being scratched by the cover assembly of the invention.

Referring now to FIG. 9, the construction of the releasable connecting means 16 is illustrated therein. FIG. 9 shows a pair of cover sheets S arranged in side-by-side relation with their substantially coextensive edges extending parallel to and spaced from each other. The connecting means 16 includes a pair of units 16a and 16b respectively connected to the adjoining edge portions of the pair of sheets of the cover assembly of the invention. Each of these connecting units 16a and 16b includes a portion 82 fixed by rivets 84 to one of the sheets S. Each portion 82 has integrally connected therewith an elongated tubular portion 86. The units 16a and 16b are connected to the pair of sheets S at their inner surfaces which are visible in FIG. 9, and in the case of the unit 16a the tubular portion 86 thereof is simply left empty so that this elongated tubular portion 86 of the unit 16a is completely open at both of its ends and all the way through its interior. On the other hand, the unit 16b fixedly carries in the interior of its tubular portion 86 an elongated pin 88 fixed to the unit 16b in its tubular portion 86 in any suitable way, as by being welded thereto, and the projecting elongated portion 88 of the unit 16b form a male member capable of being received in the female member formed by the tubular part 86 of the unit 16a. It is to be noted that the projection 88 is tapered so as to facilitate the joining together of the units 16a and 16b. Furthermore, it is to be noted that these units extend beyond the side edges of the sheets S, so that there will be maintained between the pair of sheets an elongated gap which is clearly visible in FIGS. 1 and 2. The purpose of this gap is to permit antenna rods or the like of radio equipment of the aircraft to pass through this gap.

In order to use the cover assembly of the invention, assuming that the aircraft has been suitably anchored to the ground, the operator will simply take the pair of disconnected cover sheets and fasten them together by introducing the male connecting members of the connecting means 16 into the female connecting members thereof. It is to be pointed out that one sheet can carry a pair of male members to be received in a pair of female members carried by the other sheet, or, as is preferred, where a pair of connecting means 16 are used, as will almost invariably be the case, each sheet will have a male and female connecting member for respectively corresponding with a female and male connecting member carried by the other sheet.

Once the pair of sheets are interconnected in this way by the connecting means 16 they are placed over the windshield or the like which is to be covered, and the stretchable units 50 are expanded so that the heads of the pins 60 are respectively received in the apexes 66 of the pear-shaped openings 56 in the manner described above, and in this simple way the entire cover assembly of the invention is quickly mounted with the leather or other soft material of the discs 78 of the spacer means 18 directly engaging the exterior surface of the windshield or the like so as to guarantee the presence of the gap through which air can circulate.

In order to disassemble the cover assembly of the invention, it is only required to perform the reverse of these steps, namely releasing the strips 54 from the pins 60, respectively, and then simply removing the cover assembly which thereafter can have the separate sheets thereof separated from each other by disconnecting the connecting means 16, and in this way the structure is quite compact when it is not used.

It is particularly to be noted that the elongated connecting means 16 generally extends parallel to the pair of edges of the sheets to which the connecting means 16 is fastened, while the plurality of releasable mounting means or units 50 generally extend in a direction perpendicular to the edges of the sheets where they are connected thereto in such a way that the pull provided by the plurality of stretchable units 50 will in general extend perpendicularly to the direction of the pins 88 and tubular members 86, so that as a result of this feature there is no tendency for the releasable mounting means 20 to pull the sheets apart from each other and instead a very secure mounting of the cover assembly of the invention is provided.

The hook-shaped configuration of the end 58 of each strip 54 greatly facilitates the manual displacement of the strip.

I claim:

1. A cover assembly for covering the windshield or other window of an aircraft, comprising a pair of cover sheets arranged in side-by-side relation and together having a configuration corresponding substantially to that of the window which is to be covered, said pair of sheets respectively having a pair of substantially coextensive edges located adjacent each other and said sheets respectively having inner surfaces directed toward the window covered by said sheets and outer surfaces directed away from said window, connecting means carried by said sheets adjacent said coextensive edges thereof for releasably connecting said sheets to each other in said side-by-side relation, spacer means carried by said sheets at said inner surfaces thereof and extending from said inner surfaces toward and into engagement with the window which is to be covered so as to maintain said sheets spaced from the window to provide between the latter and said sheets a gap through which air may circulate, and releasable mounting means operatively connected to said sheets for releasably mounting them on the aircraft in a position covering a window thereof, said spacer means including, respectively, non-metallic portions directly engaging the window covered by said sheets, and each of said plurality of spacer means including an angle bracket fixed to an inner surface of one of said sheets and a non-metallic disc fixed to said bracket and extending beyond the latter into engagement with the window.

2. A cover assembly as recited in claim 1 and wherein said sheets are flexible.

3. A cover assembly as recited in claim 2 and wherein said sheets are made of metal.

4. A cover assembly as recited in claim 1 and wherein said connecting means includes at least one male member fixedly carried by one of said sheets at said side edge thereof and a mating female member carried by the other of said sheets at said side edge thereof and receiving said male member.

5. A cover assembly as recited in claim 1 and wherein said mounting means includes a plurality of pins fixedly carried by the aircraft beyond the periphery of said sheets and a plurality of stretchable units connected to said sheets and releasably coupled with said pins.

6. A cover assembly as recited in claim 1 and wherein said coextensive side edges are at least partly spaced from each other to define between themselves a gap allowing equipment such as a radio antenna to pass therethrough.

7. A cover assembly as recited in claim 1 and wherein said disc is made of leather.

8. A cover assembly as recited in claim 1 and wherein said releasable mounting means is operatively connected to said sheets at said outer surface thereof.

9. A cover assembly as recited in claim 1 and wherein said sheets are of a substantially identical configuration.

10. A cover assembly as recited in claim 1 and wherein said mounting means includes a plurality of stretchable units adapted to be connected with the aircraft at locations thereof spaced beyond the periphery of said sheets and also connected to said sheets, said connecting means for releasably connecting said sheets to each other at said side edges thereof extending generally in a direction parallel to said side edges and said stretchable units being generally tensioned in a direction providing a pull perpendicular to said side edges and to said connecting means.

11. A cover assembly as recited in claim 1 and wherein said connecting means for connecting said sheets to each other at said side edges thereof extends in a direction generally parallel to said side edges to connect said sheets to each other during movement of said side edges one parallel to the other and to release said sheets from each other during movement of said side edges one parallel to the other.

References Cited

UNITED STATES PATENTS

| | | | |
|---|---|---|---|
| 1,896,129 | 2/1933 | Ward | 24—226 X |
| 2,154,863 | 4/1939 | Purinton | 24—230 X |
| 2,308,109 | 1/1943 | Rundquist | 160—183 X |
| 2,331,600 | 10/1943 | Dillow | 160—368 |
| 2,489,901 | 11/1949 | Kocinski | 160—181 |
| 2,979,129 | 4/1961 | Ketchum | 160—368 |

FOREIGN PATENTS

| | | |
|---|---|---|
| 1,038,052 | 3/1953 | France. |
| 100,777 | 10/1962 | Norway. |

DAVID J. WILLIAMOWSKY, *Primary Examiner.*

HARRISON R. MOSELEY, PETER M. CAUN,
*Examiners.*